(12) United States Patent
Petenon et al.

(10) Patent No.: US 11,109,524 B2
(45) Date of Patent: Sep. 7, 2021

(54) SINGLE DISK FERTILIZER OPENER FOR AN AGRICULTURAL PLANTER

(71) Applicant: DEERE & COMPANY, Moline, IL (US)

(72) Inventors: Pablo Petenon, Horizontina (BR); Rogerio Kroth, Horizontina (BR)

(73) Assignee: DEERE & COMPANY, Moline, IL (US)

( * ) Notice: Subject to any disclaimer, the term of this patent is extended or adjusted under 35 U.S.C. 154(b) by 167 days.

(21) Appl. No.: 16/402,803

(22) Filed: May 3, 2019

(65) Prior Publication Data

US 2020/0344940 A1 Nov. 5, 2020

(51) Int. Cl.
| | |
|---|---|
| *A01C 5/06* | (2006.01) |
| *A01B 15/04* | (2006.01) |
| *A01C 7/20* | (2006.01) |
| *A01B 49/06* | (2006.01) |
| *A01C 7/06* | (2006.01) |

(52) U.S. Cl.
CPC .............. *A01C 5/062* (2013.01); *A01B 15/04* (2013.01); *A01B 49/06* (2013.01); *A01C 5/064* (2013.01); *A01C 7/06* (2013.01); *A01C 7/20* (2013.01); *A01C 7/206* (2013.01)

(58) Field of Classification Search
CPC ........... A01C 5/062; A01C 5/064; A01C 7/06; A01C 7/20; A01C 7/206; A01B 15/04; A01B 49/06
See application file for complete search history.

(56) References Cited

U.S. PATENT DOCUMENTS

| | | | |
|---|---|---|---|
| 4,796,550 A | 1/1989 | Van Natta et al. | |
| 5,176,209 A * | 1/1993 | VandenBrink | A01B 23/02 172/730 |
| 5,398,770 A * | 3/1995 | Harden | A01B 13/08 172/140 |
| 6,701,857 B1 | 3/2004 | Jensen et al. | |
| 7,581,503 B2 | 9/2009 | Martin et al. | |
| 2005/0022706 A1 | 2/2005 | Johnston | |

(Continued)

FOREIGN PATENT DOCUMENTS

EP 2227930 A1 9/2010

OTHER PUBLICATIONS

Extended European Search Report and Written Opinion issued in European Patent Application No. 20172796.3, dated Sep. 30, 2020, in 7 pages.

(Continued)

*Primary Examiner* — Thomas B Will
*Assistant Examiner* — Ian A Normile
(74) *Attorney, Agent, or Firm* — Taft Stettinius & Hollister LLP; Stephen F. Rost

(57) ABSTRACT

A single disk fertilizer opener assembly for opening a trench in soil includes a frame support and a cutting disk for forming the trench. The cutting disk is coupled to an axle and rotates about the axle as the assembly moves in a working direction. The assembly also includes a first arm pivotally coupled to the frame support and the axle, and a second arm pivotally coupled to the frame support at a location spaced from the first arm. A bracket is coupled to the axle and the second arm, and a scraper is coupled to the bracket and disposed substantially perpendicularly to the working direction.

20 Claims, 14 Drawing Sheets

(56) References Cited

U.S. PATENT DOCUMENTS

| | | |
|---|---|---|
| 2008/0229986 A1 | 9/2008 | Arksey |
| 2009/0056962 A1 | 3/2009 | Martin et al. |
| 2010/0230124 A1 | 9/2010 | Martin |
| 2015/0107501 A1 | 4/2015 | Barton |
| 2018/0125000 A1* | 5/2018 | Levy ........................ A01C 7/06 |

OTHER PUBLICATIONS

Extended European Search Report and Written Opinion issued in European Patent Application No. 20172696.5, dated Oct. 19, 2020, in 9 pages.

* cited by examiner

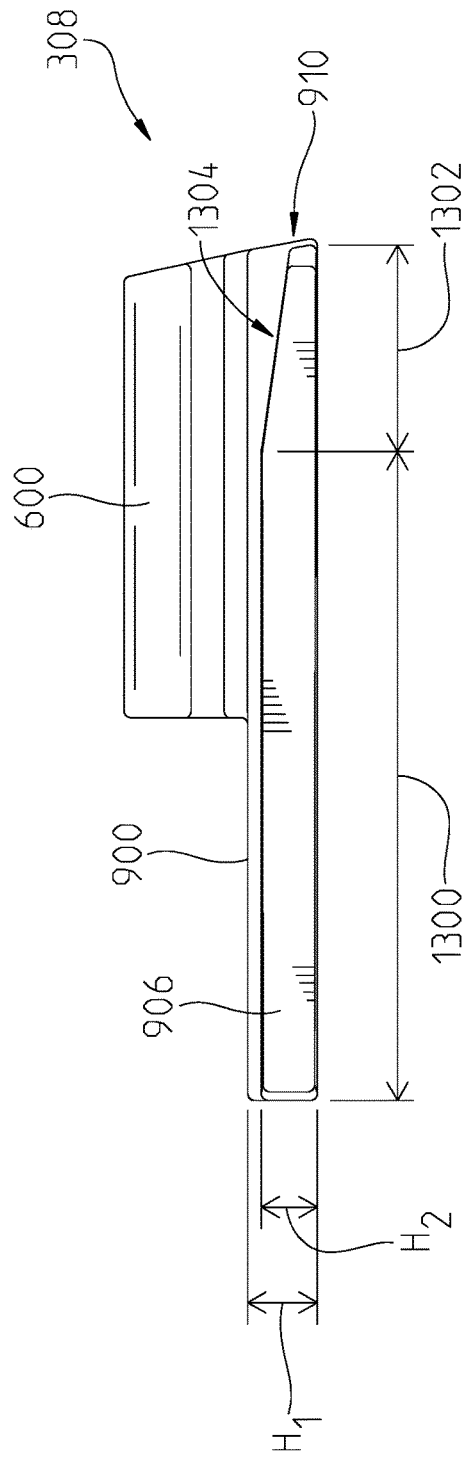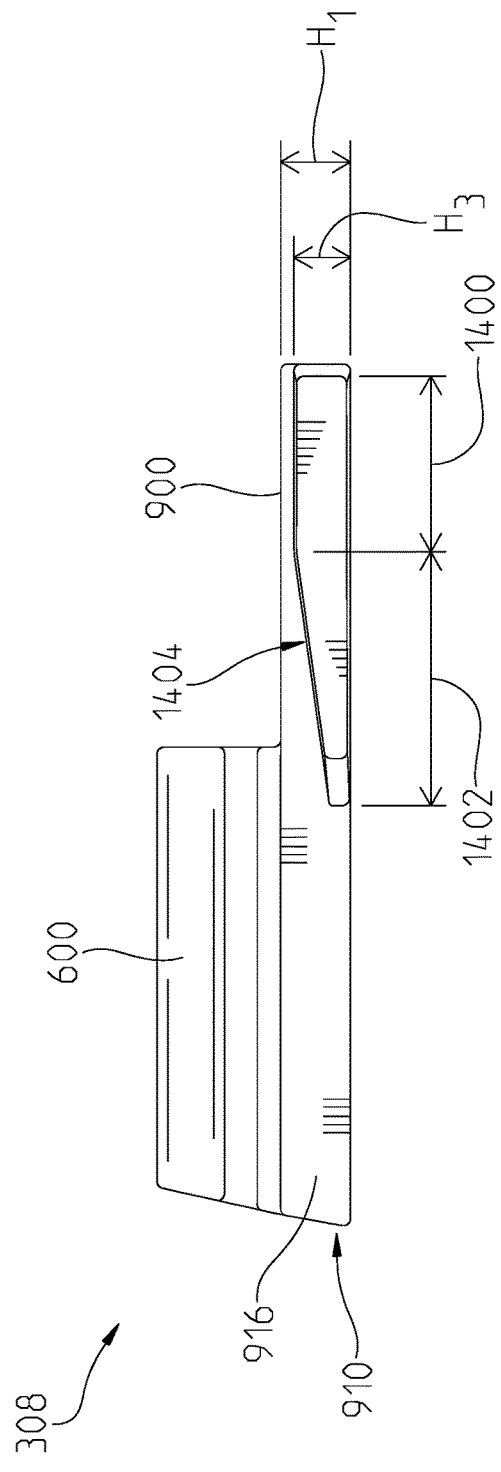
Fig. 13
Fig. 14

SINGLE DISK FERTILIZER OPENER FOR AN AGRICULTURAL PLANTER

FIELD OF THE DISCLOSURE

The present disclosure relates to an agricultural planter, and in particular, to a single disk fertilizer opener for an agricultural planter.

BACKGROUND OF THE DISCLOSURE

An agricultural seeding machine such as a row crop planter or grain drill places seeds at a desired depth within a trench formed in soil. Some agricultural machines are capable of depositing fertilizer at the same time as seeding. The fertilizer can include dry granular, gaseous or liquid fertilizer. With some of these machines, particularly when applying a gaseous fertilizer, such as anhydrous ammonia ($NH_3$), an additional delivery and distribution system is required.

SUMMARY

In one embodiment of the present disclosure, a single disk fertilizer opener configured to open a trench in soil includes a frame support; a cutting disk for forming the trench, the cutting disk coupled to an axle and configured to rotate about the axle as the assembly moves in a working direction; a gauge wheel rotatably coupled to the frame support, the gauge wheel being in contact with the soil and operably adjustable to set a depth of the trench; a first arm including a first end and a second end, the first end being pivotally coupled to the frame support and the second end being pivotally coupled to the axle; a second arm including a first end and a second end, the first end being pivotally coupled to the frame support at a location spaced from the first end of the first arm; a bracket coupled to the axle and the second end of the second arm; a scraper coupled to the bracket and disposed substantially perpendicularly to the working direction; a fertilizer tube coupled to the bracket and disposed substantially perpendicular to the working direction; and a wing removably coupled to a bottom portion of the scraper; wherein, the first and second arms are substantially parallel to one another.

In a first example of this embodiment, the first and second arms pivot about the frame support between a raised position and a lowered position; and the scraper and fertilizer tube remain substantially perpendicular to the working direction as the first and second arms pivot between their raised and lowered positions. In a second example, the cutting disk is disposed at an angle relative to the working direction. In a third example, the wing includes a body and a coupling mechanism; the scraper comprises a defined longitudinal slot in its bottom portion which is configured to receive the coupling mechanism when the wing is coupled thereto; the wing comprises a leading edge and a trailing edge, the leading edge positioned lower than the trailing edge when coupled to the scraper. In a fourth example, a first wing portion and a second wing portion are integrally formed with the body of the wing; wherein, the first and second wing portions are substantially planar and comprise a plurality of edges that taper outwardly from front to rear.

In another embodiment of this disclosure, a single disk fertilizer opener assembly for opening a trench in soil includes a frame support; a cutting disk for forming the trench, the cutting disk coupled to an axle and configured to rotate about the axle as the assembly moves in a working direction; a first arm including a first end and a second end, the first end being pivotally coupled to the frame support and the second end being pivotally coupled to the axle; a second arm including a first end and a second end, the first end being pivotally coupled to the frame support at a location spaced from the first end of the first arm; a bracket coupled to the axle and the second end of the second arm; and a scraper coupled to the bracket and disposed substantially perpendicularly to the working direction.

In one example of this embodiment, the first arm and the second arm are substantially parallel to one another. In a second example, the first and second arms pivot about the frame support between a raised position and a lowered position; and the scraper remains substantially perpendicular to the working direction as the first and second arms pivot between the raised and lowered positions. In a third example, the cutting disk is disposed at an angle relative to the working direction.

In a fourth example, a fertilizer tube is coupled to the bracket and disposed substantially perpendicular to the working direction. In a fifth example, the bracket includes a slot defined therein to which the fertilizer tube is coupled, the fertilizer tube being adjustably coupled vertically within the slot. In a sixth example, a wing is removably coupled to a bottom portion of the scraper.

In another example, the wing has a body and a coupling mechanism, and the scraper defines a longitudinal slot in its bottom portion which is configured to receive the coupling mechanism when the wing is coupled thereto. In a further example, the wing includes a leading edge and a trailing edge, the leading edge is located lower than the trailing edge when coupled to the scraper. In yet another example, a first wing portion and a second wing portion are integrally formed with the body of the wing, the first wing portion having a greater length than the second wing portion; wherein, the first and second wing portions are substantially planar and comprise a plurality of edges that taper outwardly from front to rear.

In a further embodiment of the present disclosure, a single disk fertilizer opener assembly for opening a trench in soil includes a frame support; a cutting disk rotatably coupled to an axle, the cutting disk configured to open the trench as it travels in a working direction; a first arm pivotally coupled between the frame support and the axle; a second arm pivotally coupled to the frame support, the second arm being substantially parallel to the first arm; a bracket coupled to the axle and the second arm; and a scraper coupled to the bracket and disposed substantially perpendicularly to the working direction.

In a first example of this embodiment, the first and second arms pivot about the frame support between a raised position and a lowered position; and the scraper remains substantially perpendicular to the working direction as the first and second arms pivot between the raised and lowered positions. In a second example, a fertilizer tube is coupled to the bracket and disposed substantially perpendicular to the working direction as the first and second arms pivot between the raised and lowered positions. In another example, the cutting disk is disposed at an angle relative to the working direction. In yet another example, the assembly includes a wing removably coupled to a bottom portion of the scraper, wherein the wing comprises a body having a leading edge and a trailing edge, a first wing portion and a second wing portion; wherein, the leading edge is positioned lower than the trailing edge when coupled to the scraper; wherein, the first and second wing portions are substantially planar and comprise a plurality of edges that taper outwardly from front to rear.

In yet a further embodiment of the present disclosure, a wing is removably coupled to a single disk fertilizer opener for breaking apart soil in a trench, including a body comprising a front end, a rear end, a first side, and a second side; a first wing portion integrally formed with the body, the first wing portion extending laterally outward from the first side of the body; a second wing portion integrally formed with the body, the second wing portion extending laterally outward from the second side of the body; and a coupling mechanism integrally formed with the body, the coupling mechanism configured to be coupled to the opener.

In a first example of this embodiment, the coupling mechanism comprises a base portion, a neck portion, and a cylindrical portion, the neck portion having a smaller width than the base portion and the cylindrical portion. In a second example, the base portion, the neck portion, and the cylindrical portion each comprise approximately the same length. In a third example, the coupling mechanism comprises a first length and the body comprises a second length, the first length being less than the second length. In a fourth example, the coupling mechanism is integrally formed with the body towards the front end thereof.

In a fifth example, the body comprises a length defined between a leading edge and a trailing edge, the length of the body being greater than the length of at least one of the first wing portion and second wing portion. In a sixth example, the first wing portion is longer than the second wing portion. In a seventh example, the first wing portion comprises a smaller width than the second wing portion.

In an eighth example, the first wing portion comprises a first tapering edge and a second tapering edge, the first tapering edge forming a front edge of the first wing portion; the second wing portion comprises a first tapering edge and a second tapering edge, the first tapering edge forming a front edge of the second wing portion; the body comprises a length defined between a leading edge and a trailing edge, the front edge of the first wing portion tapering inwardly towards and being integrally coupled with the leading edge. In a ninth example, the front edge of the second wing portion is not integrally coupled with the leading edge of the body. In a tenth example, the second tapering edges of the first and second wing portions are integrally coupled with the trailing edge of the body.

In an eleventh example, the first wing portion and second wing portion are asymmetrical. In a twelfth example, the first wing portion comprises a first thickness and the second wing portion comprises a second thickness, wherein the first thickness and the second thickness are approximately the same. In another example, the first wing portion comprises a length defined by a first longitudinal section and a second longitudinal section, the first longitudinal section comprising a substantially constant thickness and the second longitudinal section comprising a tapering thickness. In yet another example, the second wing portion comprises a length defined by a first longitudinal section and a second longitudinal section, the first longitudinal section comprising a substantially constant thickness and the second longitudinal section comprising a tapering thickness.

In a further example, the body comprises a body length defined between a leading edge and a trailing edge; the first wing portion comprises a first length defined by a first longitudinal section integrally formed with the trailing edge and a second longitudinal section integrally formed with leading edge, the first longitudinal section comprising a substantially constant thickness and the second longitudinal section comprising a tapering thickness; the second wing portion comprises a second length defined by a first longitudinal section integrally formed with the trailing edge and a second longitudinal section, the first longitudinal section comprising a substantially constant thickness and the second longitudinal section comprising a tapering thickness.

In another example, the first longitudinal section of the first wing portion is longer than the second length. In yet another example, the body comprises a body height, the first wing portion comprises a first maximum height, and the second wing portion comprises a second maximum height, the body height being greater than the first maximum height and the second maximum height. In a further example, the coupling mechanism comprises a front face and a rear face, the front face tapering downwardly to a leading edge of the body. In yet a further example, a first width formed by the front end of the body; and a second width formed by the rear end of the body, a first rear edge of the first wing portion, and a second rear edge of the second wing portion; wherein, the first width is smaller than the second width.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 13 is a second side view of the wing;

FIG. 14 is a first side view of the wing;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
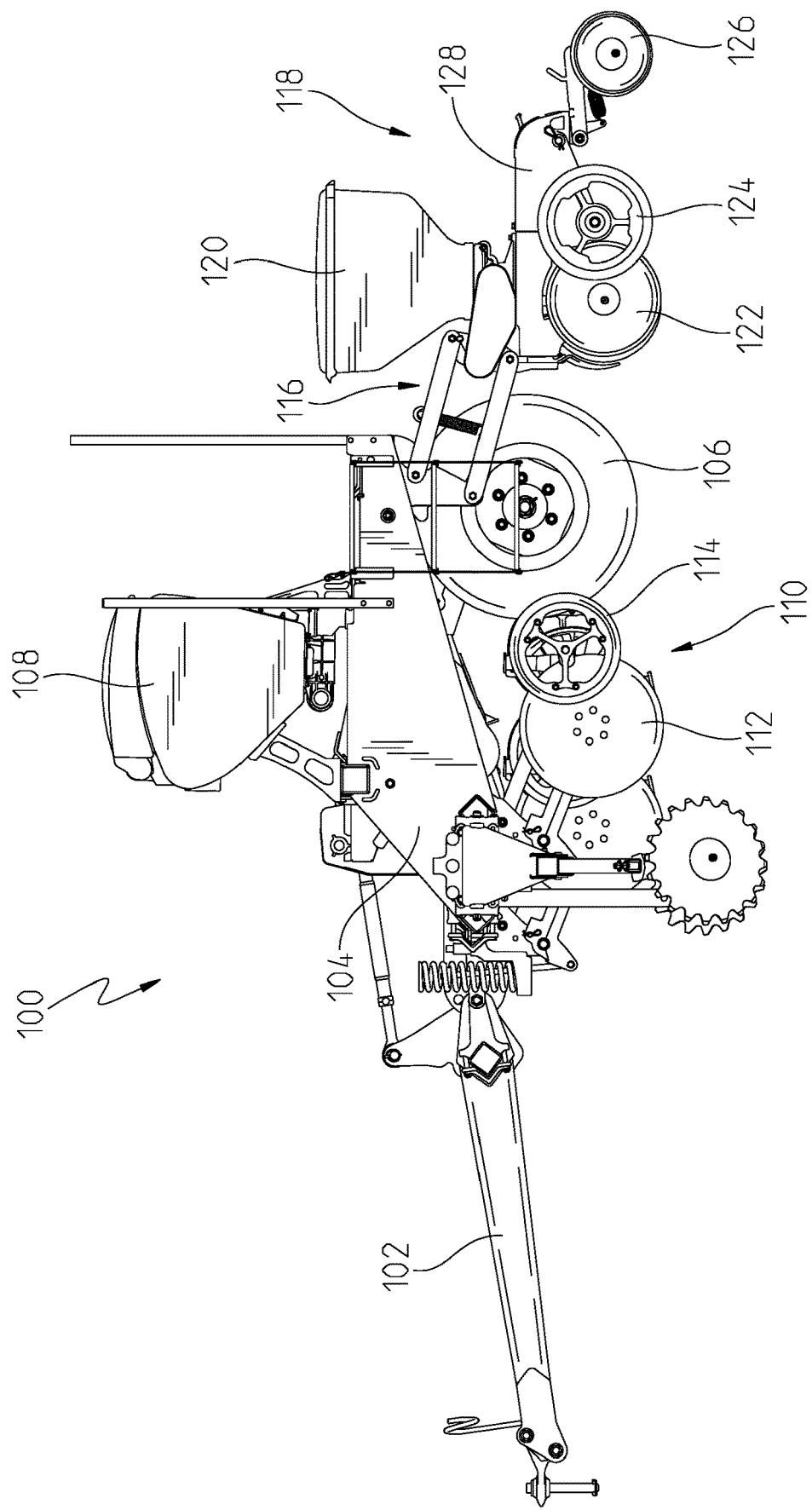
FIG. 1 is a side view of a planting implement.

Referring to FIG. 1 of the present disclosure, a planting unit or implement 100 is shown. The planting implement 100 may include a main frame 104 to which a tow bar 102 is attached to allow the implement to be coupled to an agricultural machine such as a tractor (not shown). The implement 100 may include one or more wheels 106 for traversing along the soil or ground.

The planting implement may include a plurality of planting units 118 attached to the main frame 104 thereof. In FIG. 1, a single planting unit 118 is shown attached to the main frame 104 via a parallel linkage 116. The parallel linkage 116 allows for independent vertical movement of the planting unit 118 as it traverses along uneven ground.

Each planting unit 118 may include its own frame 128 to which a seed hopper 120 is coupled. The seed hopper 120 may store seed to be planted by the planting unit 118 during a planting operation. Seed may be deposited within a trench or furrow formed by a trench-forming disk 122. The depth at which the trench-forming disk 122 is set relative to the soil may be set by a gauge wheel 124 and a depth-setting mechanism (not shown). A pair of closing wheels 126 may be further coupled to the frame 128 of the planting unit 118 in order to close or cover the trench with soil, as is known in the art.

A fertilizer applicator or single disk fertilizer opener assembly 110 is shown coupled to the main frame 100 of the planting implement 100. As shown, the assembly 110 may include a hopper 108 for storing fertilizer, e.g., dry granular fertilizer, or a tank for storing gaseous or liquid fertilizer. The single disk fertilizer opener assembly 110 may further include a cutting disk 112 and a gauge wheel 114. As will be described in further detail below, the cutting disk 112 may be set at a defined depth into the soil to form a furrow or trench therein. The gauge wheel 114 may be used to set the depth of the furrow or trench to be formed by the cutting disk 112.

A conventional single disk fertilizer opener assembly is designed with a single arm mounted to the frame of the assembly and to which a boot or scraper is connected. The conventional boot or scraper may be positioned behind the conventional cutting disk relative to a forward or working direction. The cutting disk again forms a trench in the soil as the assembly moves in the forward or working direction. The boot or scraper may lie within the trench profile so as not to widen the trench formed in the soil by the disk, or it may be positioned slightly offset from the disk to slightly widen the trench (e.g., ¼ inch), depending upon the application. During operation, the boot or scraper has a contour closely matching with the trench side of the cutting disk to effectively scrape mud, soil and other debris from the trench side of the disk. The bottom portion of the boot or scraper is displaced into the soil at a desired depth to which fertilizer may be applied.

As the conventional single disk fertilizer opener assembly moves in the forward or working direction, it may encounter different or uneven terrain. As it does, the single arm pivots relative to its connection to the frame of the assembly. When the single arm pivots relative to the frame, the orientation of the boot or scraper also changes relative to the soil. This can be problematic as the boot or scraper may become disoriented relative to the ground, and in some instances it may no longer be disposed at the desired depth for cleaning the cutting disk.

Another issue with the conventional single disk fertilizer opener is that a fertilizer tube is often coupled to the boot or scraper. The fertilizer tube has an outlet at which the fertilizer is applied or deposited into the soil at a desired depth. With the fertilizer tube being coupled to the boot or scraper, the fertilizer tube needs to be vertically aligned within the trench so that the fertilizer reaches the desired depth. As the boot or scraper, however, pivots as the single arm pivots relative to the frame, the fertilizer tube is also pivoted relative to its vertical orientation (or perpendicular orientation) with respect to the trench. As this happens, fertilizer may not be placed at the necessary depth in the soil.

Figure 2:
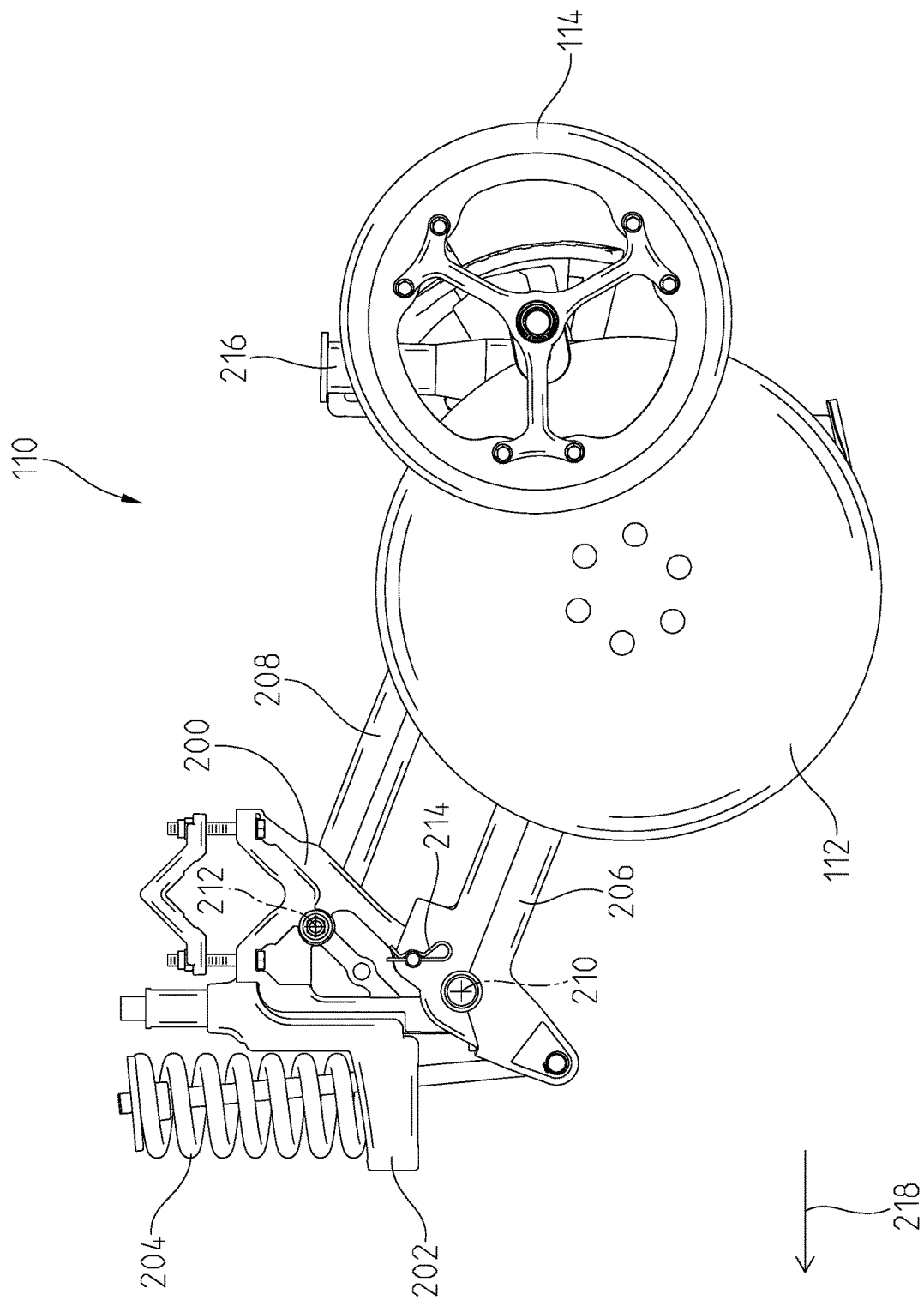
FIG. 2 is a side view of a first side of a single disk fertilizer opener.
Figure 3:
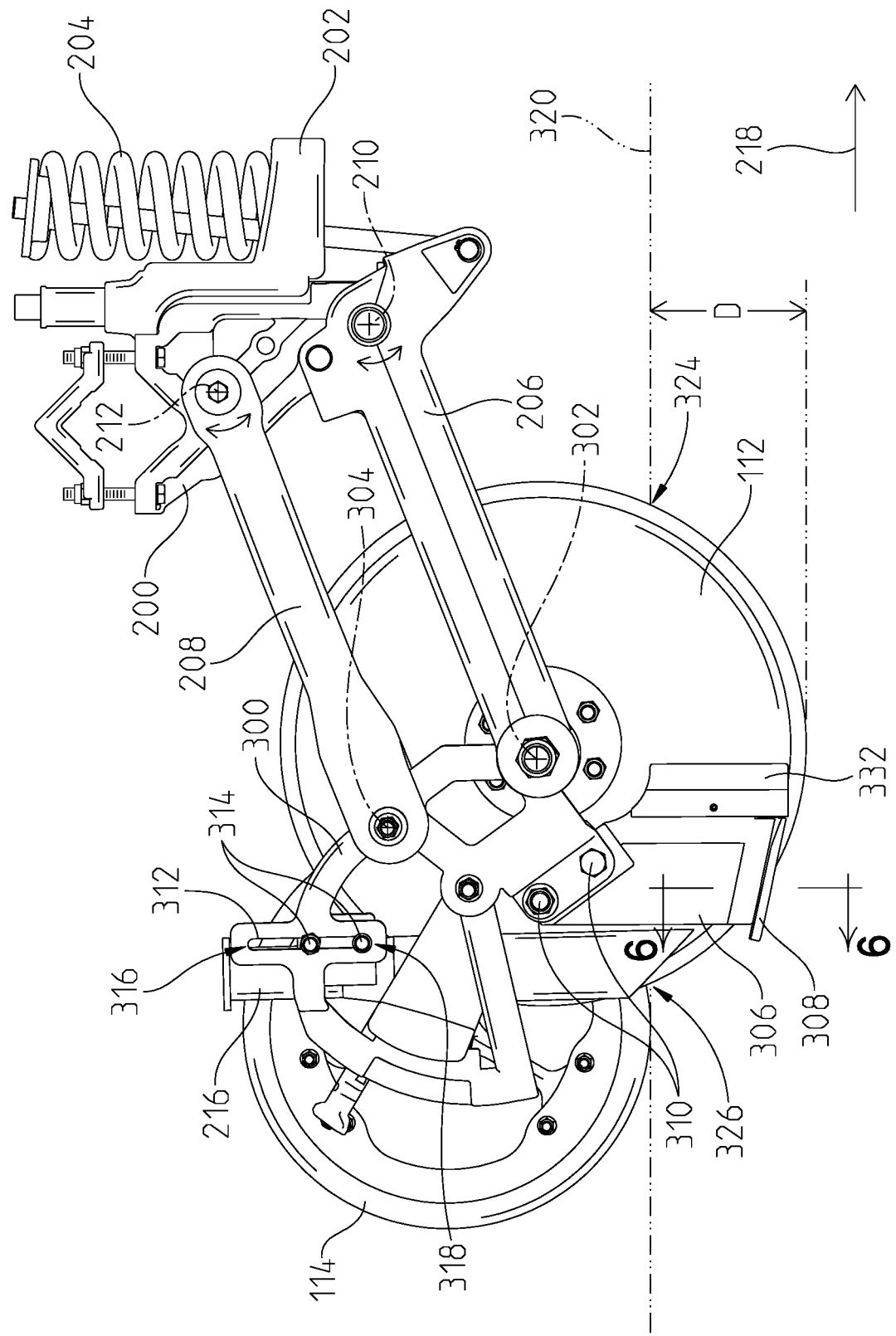
FIG. 3 is a side view of a second side of the single disk fertilizer opener of FIG. 2 in its raised position.
Figure 4:
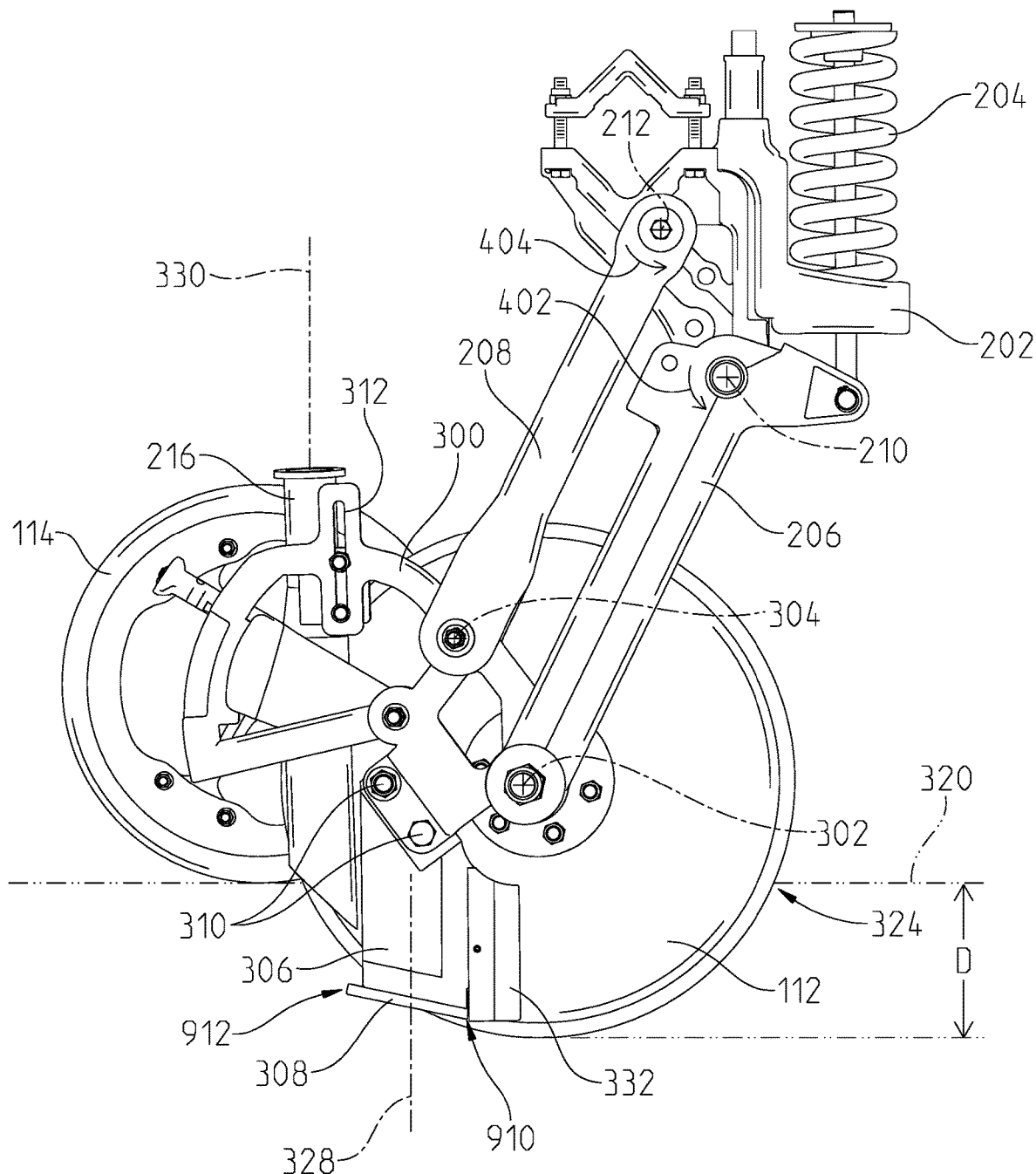
FIG. 4 is a side view of the single disk fertilizer opener of FIG. 2 in its lowered position.

In the present disclosure, it is desirable to couple the boot or shank to the single disk fertilizer opener to maintain its orientation perpendicular with respect to the trench formed in the soil by the cutting disk. To do so, a second, substantially parallel arm may be provided. Referring to FIGS. 2-4, a single disk fertilizer opener assembly 110 is shown. The assembly 110 is shown including a frame support 200, which may be part of or coupled to the frame 104. A support member 202 is coupled to the frame support 200. The assembly 110 may also include a compression spring 204 for assisting with applying a downforce to the overall assembly 110. A depth adjuster (not shown) may be included to move the vertical orientation of the gauge wheel 114 relative to the cutting disk 112 to thereby adjust the cutting depth of the disk 112 into the soil.

The assembly 110 in FIGS. 2-4 also includes a first arm 206 and a second arm 208. The first arm 206 and second arm 208 may be parallel to one another as shown. The first arm 206 may be pivotally coupled to the frame support 200 via a first pivot pin or fastener 210. The first arm 206 is able to pivot about a first pivot axis about the first pivot pin 210. Likewise, the second arm 208 may be pivotally coupled to the frame support 200 via a second pivot pin or fastener 212. The second pivot pin 212 defines a second pivot axis about which the second arm 208 pivots relative to the frame support 200. The first arm 206 may also include a hairpin 214 as shown in FIG. 2.

In FIGS. 2-4, the single disk fertilizer opener assembly 110 is configured to move in a forward or working direction 218 and form a trench in the soil 320 into which one or more fertilizer types (e.g., dry, gaseous or liquid fertilizer, e.g., $NH_3$ fertilizer) is deposited. The fertilizer may be fed from a hopper or tank 108 into a fertilizer tube 216 and deposited into the trench formed by the cutting disk 112. In FIG. 3, for example, the cutting disk 112 is disposed at a cutting depth, D, into the soil to form the trench.

Figure 5:
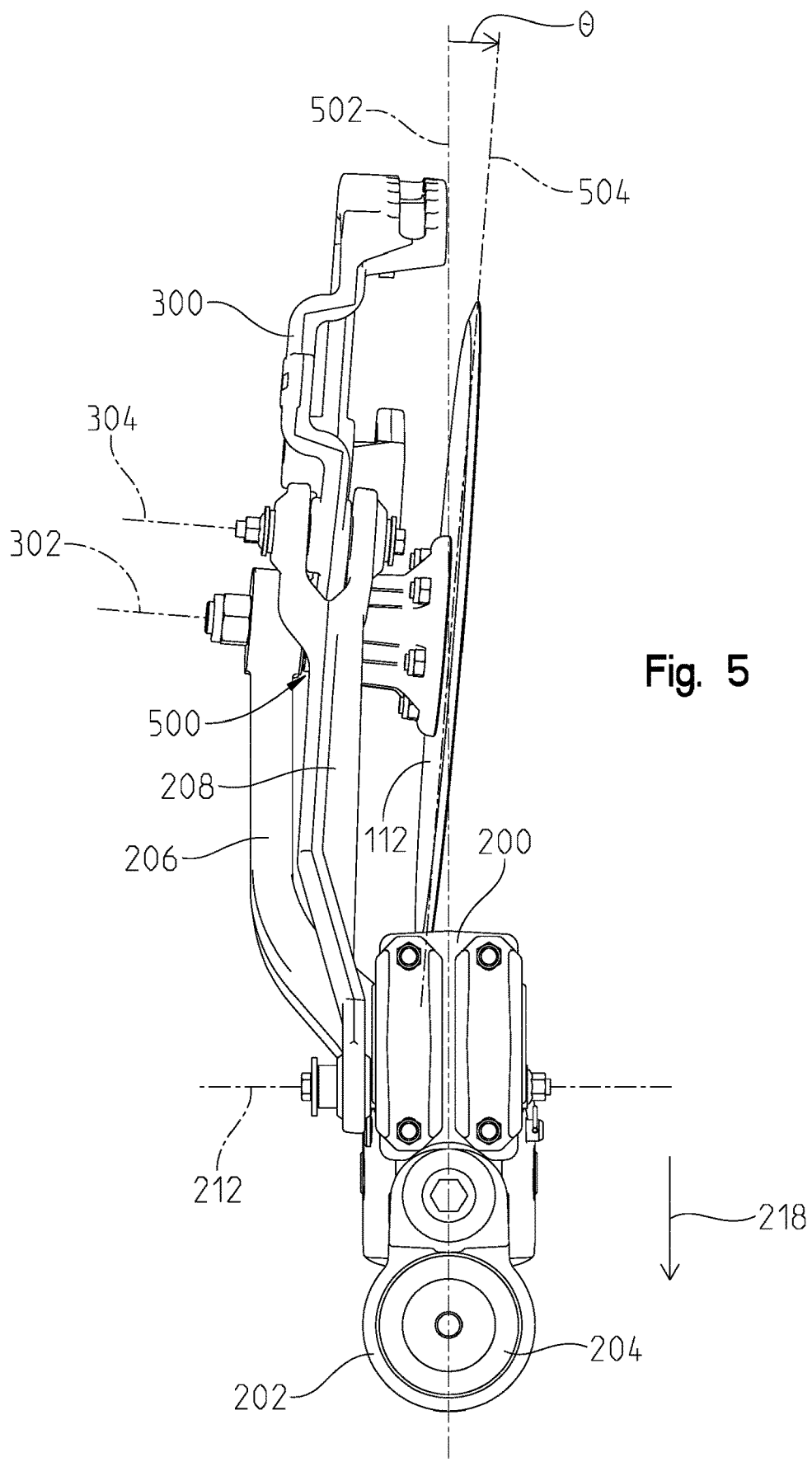
FIG. 5 is a partial top view of the single disk fertilizer of FIG. 2.

As shown in FIG. 5, the cutting disk 112 rotates about a bushing 500 which defines an axis of rotation 302 passing therethrough. The cutting disk 112 may include a leading edge 324 (identified in FIG. 3) and a trailing edge 326 (identified in FIG. 3) relative to the forward or working direction 218. The cutting disk 112 may be substantially planar, but may have any cutting disk shape, e.g., a known or conventional shape for a cutting disk. The cutting disk 112 may be aligned along a disk plane 504 and oriented at an angle, $\Theta$, relative to a steer plane 502. The steer plane 502 may be aligned with, e.g., parallel or generally parallel to, the forward or working direction 218, as shown in FIG. 5.

In FIG. 3, the single disk fertilizer opener assembly 110 may include a bracket 300 to which the first arm 206 and the second arm 208 are coupled. The first arm 206 is coupled to the bracket 300 about an axle 302. The axle 302 defines the rotation axis of the cutting disk 112, and the bushing 500 is aligned with the axle 302. The second arm 208 is coupled to the bracket at a location spaced from the axle 302. Here, a bolt or other fastener 304 couples the bracket 300 to the second arm 208.

A boot 306 or shank may be further coupled to the bracket 300 via one or more fasteners 310. A wing 308, which will be described in further detail below, is coupled to a bottom portion of the boot 306.

Figure 7:
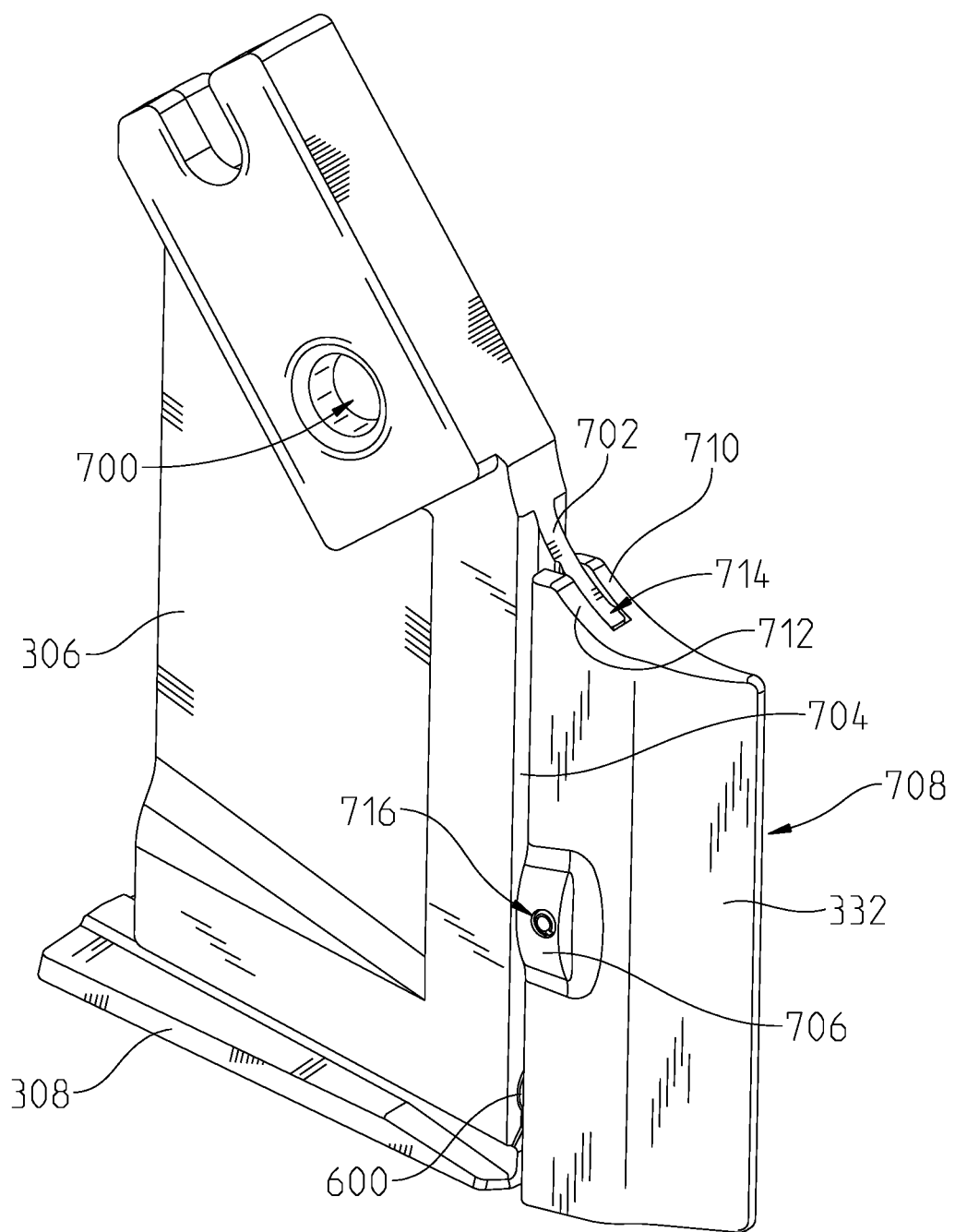
FIG. 7 is perspective view of a boot, a scraper and a wing of the single disk fertilizer of FIG. 2 coupled to one another.
Figure 8:
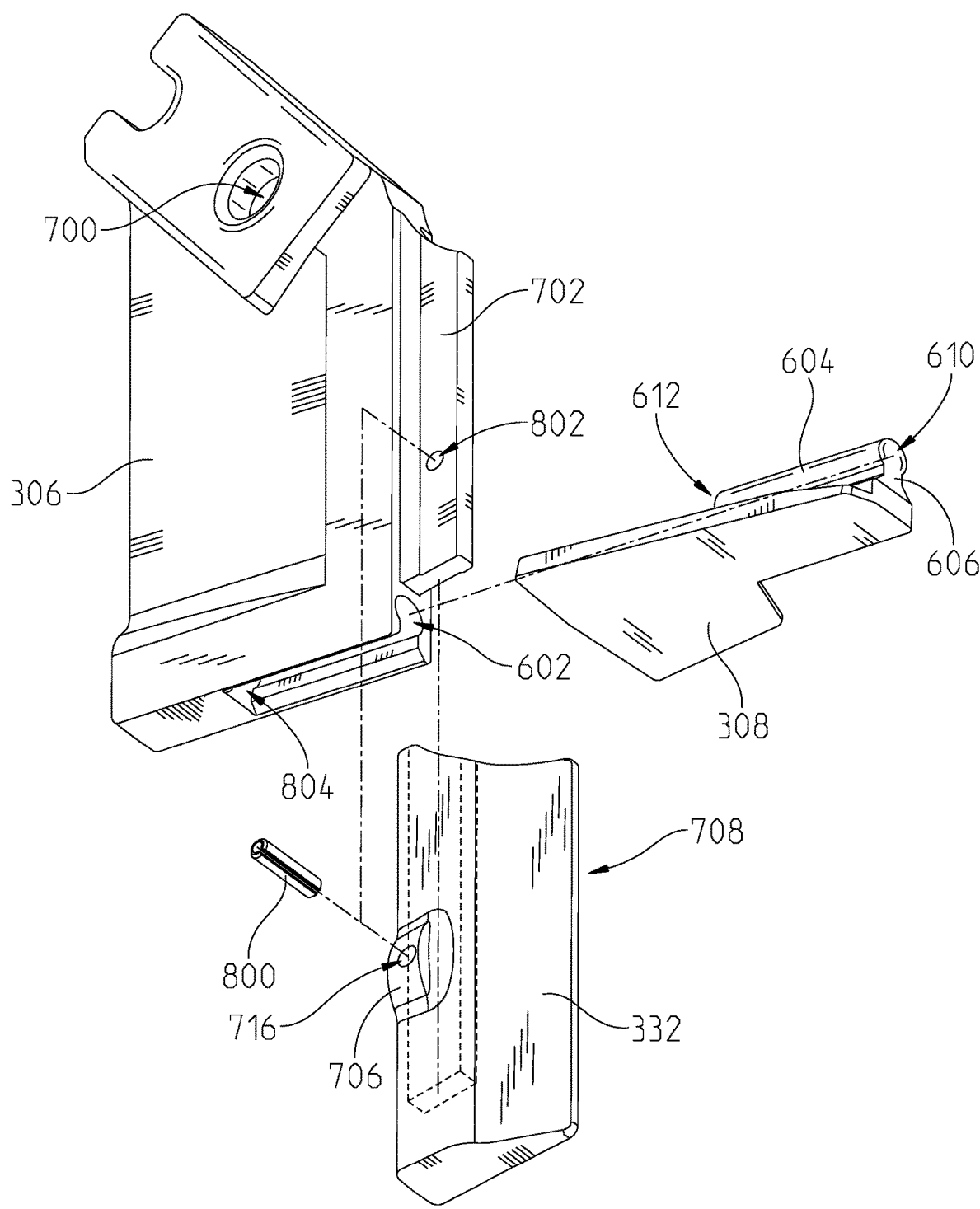
FIG. 8 is an exploded perspective view of the boot, scraper and wing of FIG. 7.

The boot 306 and a scraper 332 may be positioned laterally behind the cutting disk 112 relative to the forward or working direction 218. As shown in FIGS. 7 and 8 of the present disclosure, the boot 306 forms a body which defines at least one opening 700 for receiving a fastener 310. The boot 306 may further define a forward-facing wall 704 and a finger 702 which protrudes forwardly therefrom. The finger 702 may have an elongated profile in a longitudinal direction (i.e., which is generally perpendicular to the working direction) and a width which is less than that of the wall 704. The scraper 332 may form a first member 710 and a second member 712 at one end and a scraper edge 708 at an opposite end thereof. The first member 710 and second member 712 may be spaced from one another to define a sleeve 714 therebetween. The sleeve 714 may be wide enough to receive the finger 702 of the boot 306. An embodiment of this is shown in FIG. 7.

The scraper 332 may also include a coupling member 706 which defines an opening 716 therethrough, as shown in FIG. 7. Likewise, the boot 306 may also include an opening 802 formed in the finger 702. As shown in FIG. 8, when coupling the scraper 332 to the boot 306, the opening 716 in the coupling member 706 of the scraper 332 is aligned with the opening 802 in the finger 702 with the finger 702 positioned within the sleeve 714. A fastener 800 may then be used to couple the scraper 332 to the boot 306.

In one embodiment, the boot 306 and/or scraper 332 may lie within the trench profile formed by the cutting disk 112 so as not to widen the trench formed in the soil. Alternatively, the boot 306 and/or scraper 332 may be positioned slightly offset from the cutting disk 112 to widen the trench (e.g., ¼ inch), depending upon the application. Similar to the conventional boot or scraper described above, the boot 306 in FIG. 3 may also include a contour closely matching with the trench side of cutting disk 112 to effectively scrape mud, soil and other debris from the trench side of disk 112.

The fertilizer tube 216 may be coupled to the bracket 300. As shown in FIG. 3, the bracket 300 may include a slot 312 defined therein having a first end 316 and a second end 318. One or more fasteners 314 may be used to couple the fertilizer tube 216 to the bracket 300. The position of the fertilizer tube relative to the bracket 300 is adjustable within the slot 312. In the position shown in FIG. 3, the fertilizer tube 216 is coupled at the second end 318 of the slot 312 such that fertilizer may be deposited into the trench.

In FIG. 3, another feature of the single disk fertilizer opener assembly 110 is the orientation of the boot 306 and the fertilizer tube 216. FIG. 3 represents a position of the assembly 110 in which the first arm 206 and second arm 208 are pivoted towards their uppermost or raised position. As shown, the boot 306 is disposed along a first axis 328, which is substantially vertical and perpendicular to the ground or soil 320. Moreover, the fertilizer tube 216 is disposed along a second axis 330, which is substantially parallel to the first axis 328. The second axis 330, and thus the fertilizer tube, is disposed substantially vertical and perpendicular to the ground or soil 320.

In FIG. 4, the single disk fertilizer opener assembly 110 is shown with the first arm 206 and second arm 208 pivoted towards their lowered position. To pivot between their raised and lowered positions, the first arm 206 may pivot in a clockwise or counterclockwise direction 402 about the first pivot axis 210, and the second arm 206 may also pivot about the second pivot axis 212 in a clockwise direction or a counterclockwise direction 404. As the pair of arms 206, 208 pivots about the frame support 200, the second arm 208 functions as a guide arm for maintaining the bracket 300 in the same, substantially vertical orientation as it is shown in FIG. 3, e.g., when the arms are in or near their uppermost or raised position(s). As it does, the boot 306 remains substantially vertically-oriented or perpendicular with respect to the ground or soil 320. In the same way, the fertilizer tube 216 also remains substantially vertically-oriented or perpendicular with respect to the ground or soil 320. Thus, while the bracket 300 articulates or rotates about the axle 302, the second arm 208 is able to maintain the orientation of the boot 306 and fertilizer tube 216 as the assembly 110 moves vertically with changes in the terrain and deposit the fertilizer into the trench formed by the cutting disk 112.

Thus, the second arm 208 is capable of maintaining the boot 306, the scraper 332 (which is coupled to the boot 306 as described above), and the fertilizer tube 216 positioned in a generally vertical or perpendicular orientation with respect to the soil regardless of the pivotal movement of the first and second arms. In other words, the boot 306, the scraper 332, and the fertilizer tube 216 are maintained in the same orientation with respect to the soil regardless of whether the arms are in or near their lowermost position, uppermost position or any position therebetween. As a result, the single disk fertilizer opener is able to move vertically by a greater amount than many conventional openers and still maintain the perpendicular orientation of the scraper 332 and fertilizer tube 216 with respect to the soil. Moreover, due to this benefit, fertilizer can be dispensed at the desired location and depth and the trench can be widened, if desired.

In conventional single disk fertilizer openers, an inclinated cutting disk is required to avoid overly disturbing the soil. The cutting disk 112 in FIG. 5, for example, is also shown as an inclinated disk disposed along a disk plane 504 which is oriented at an angle, Θ, relative to the steer plane 502. As a conventional cutting disk penetrates, e.g., is drawn through, the soil, however, it produces compact side walls in the trench or furrow that makes it difficult for the root system of crops to properly develop. In addition, a conventional opener often requires a significant amount of downforce in order to achieve a desired depth to place the fertilizer in the soil.

Figure 9:
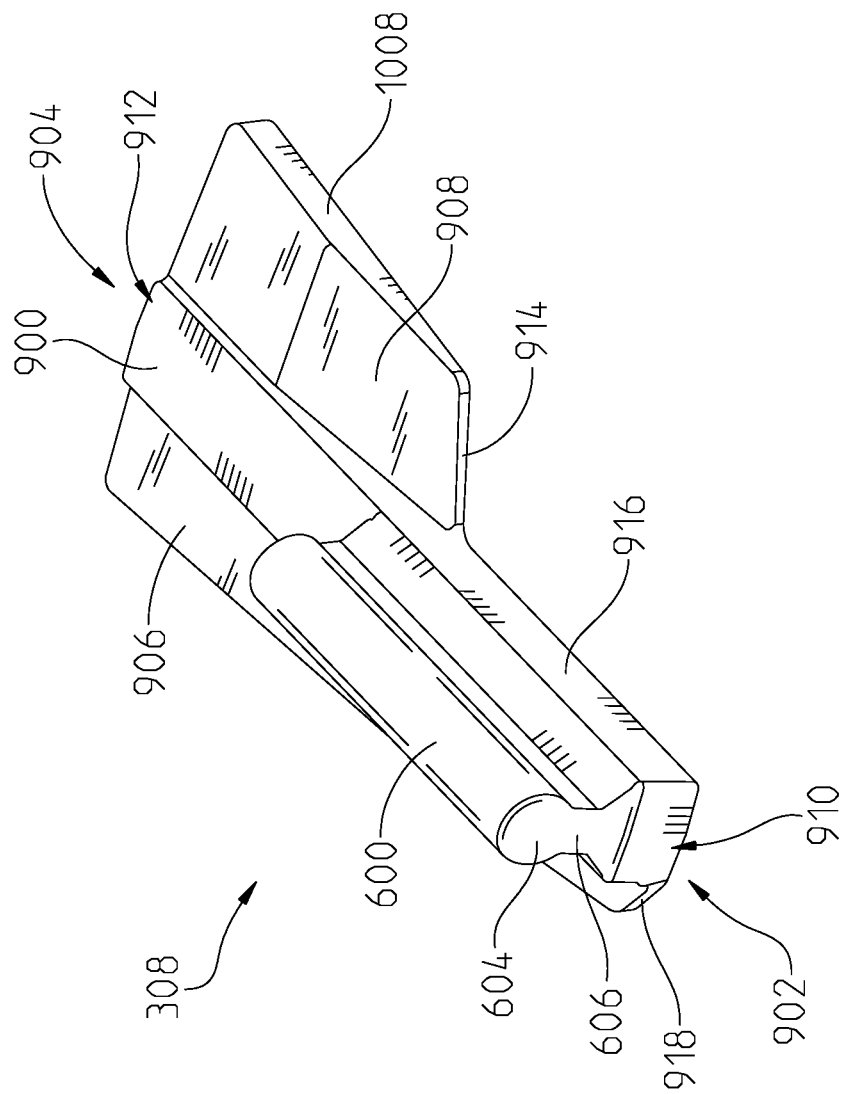
FIG. 9 is a perspective view of a first side of the wing.

In one embodiment of the present disclosure, a wing 308 may be coupled to the bottom of the boot 306 of the single disk fertilizer opener assembly 110. As shown in FIGS. 6-15, the wing 308 may include a coupling mechanism 600 for coupling to the boot 306. In particular, as shown in FIG. 9, the wing 308 includes a body 900 having a front end 902, which defines its leading edge 910, and a rear end 904, which defines its trailing edge 912. A first lateral wing portion 906 is integrally formed with the body 900 on a first side of the body 900, and a second lateral wing portion 908 is integrally formed with the body 900 on a second side thereof. The first and second wing portions are substantially planar and can have a thickness less than the body 900. In some embodiments, the thickness of one or both of the lateral wing portions 906, 908 is constant from front to back. In some embodiments, the thickness of the lateral wing portions 906, 908 decreases or increases from front to back.

In the illustrated embodiment of FIG. 13, the first side of the wing 308 is shown. Here, the first lateral wing portion 906 may include a first longitudinal section 1300 and a second longitudinal section 1302. Each longitudinal section has a defined length. In one embodiment, the first longitudinal section 1300 may be longer than the second longitudinal section 1302. In another embodiment, the first longitudinal section 1300 may be shorter than the second longitudinal section 1302. In a further embodiment, the first longitudinal section 1300 may be approximately the same length as the second longitudinal section 1302. The overall length of the first lateral wing portion 906 is shown as $L_1$ in FIG. 10.

The first longitudinal section 1300 of the first lateral wing portion 906 may have a substantially uniform or constant height, $H_2$. The body 900 may have a height, $H_1$. In one embodiment, the height, $H_1$, of the body 900 may be greater than the height, $H_2$, of the first longitudinal section 1300 of the first lateral wing portion 906. In another embodiment, the height, $H_1$, of the body 900 may be less than the height, $H_2$, of the first longitudinal section 1300 of the first lateral wing portion 906. In a further embodiment, the height, $H_1$, of the body 900 may be approximately the same as the height, $H_2$, of the first longitudinal section 1300 of the first lateral wing portion 906.

As shown in FIG. 13, the second longitudinal section 1302 may have a tapering height such that it has a top surface 1304 in which its height is greatest at the location closest to the first longitudinal section 1300. The height then tapers to its shortest height towards the front 902 of the wing 308. The tapering second longitudinal portion 1302 of the first lateral wing portion 906 may allow the wing 308 to better fracture or break up the lateral side walls of the trench as it penetrates therethrough.

Referring to FIG. 14, a second side of the wing 308 is shown. In particular, the relationship between the second lateral wing portion 908 and the body 900 is illustrated in FIG. 14. In this embodiment, the second lateral wing portion 908 may include a first longitudinal section 1400 and a second longitudinal section 1402. Each longitudinal section has a defined length. In one embodiment, the first longitudinal section 1400 may be longer than the second longitudinal section 1402. In another embodiment, the first longitudinal section 1400 may be shorter than the second longitudinal section 1402. In a further embodiment, the first longitudinal section 1400 may be approximately the same length as the second longitudinal section 1402. The overall length of the second lateral wing portion 908 is shown as $L_2$ in FIG. 10.

The first longitudinal section 1400 of the second lateral wing portion 908 may have a substantially uniform or constant height, $H_3$. The body 900 may have a height, $H_1$. In one embodiment, the height, $H_1$, of the body 900 may be greater than the height, $H_3$, of the first longitudinal section 1400 of the second lateral wing portion 908. In another embodiment, the height, $H_1$, of the body 900 may be less than the height, $H_3$, of the first longitudinal section 1400 of the second lateral wing portion 908. In a further embodiment, the height, $H_1$, of the body 900 may be approximately the same as the height, $H_3$, of the first longitudinal section 1400 of the second lateral wing portion 908.

As shown in FIG. 14, the second longitudinal section 1402 may have a tapering height such that a top surface 1404 of the second longitudinal section 1402 has its greatest height at the location closest to the first longitudinal section 1400 and then it tapers to its shortest height towards the front 902 of the wing 308. Similar to the second longitudinal section 1302 of the first lateral wing portion 906, the tapering second longitudinal portion 1402 of the second lateral wing portion 908 may allow the wing 308 to better fracture or break up the lateral side walls of the trench as it penetrates therethrough.

Figure 12:
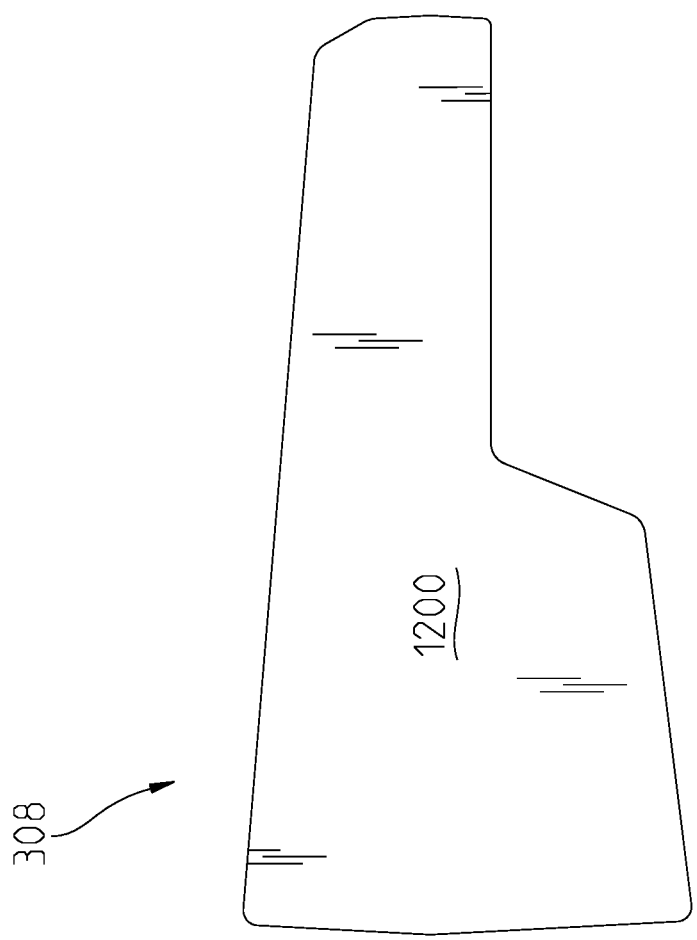
FIG. 12 is a bottom view of the wing.
Figure 16:
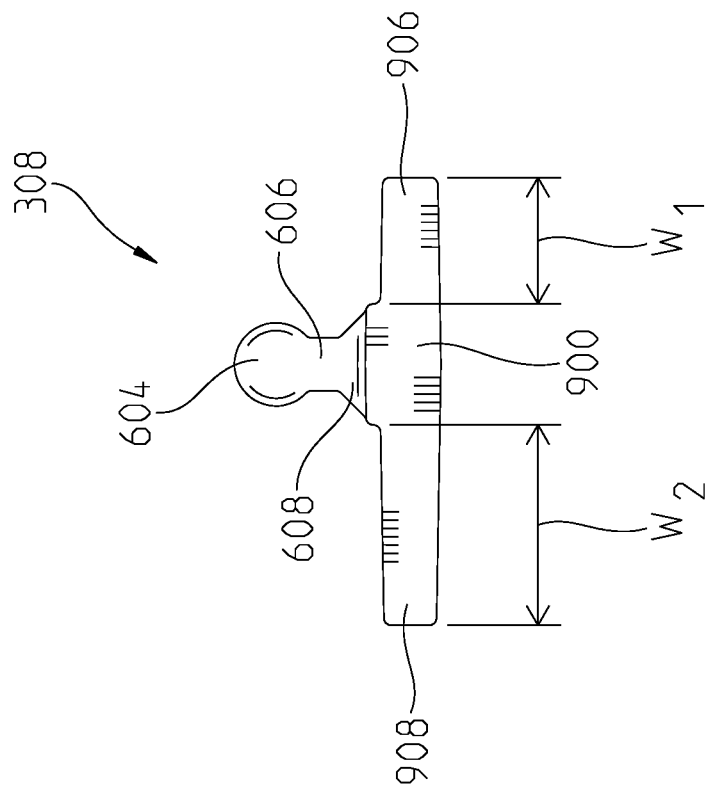
FIG. 16 is a rear view of the wing.
Figure 15:
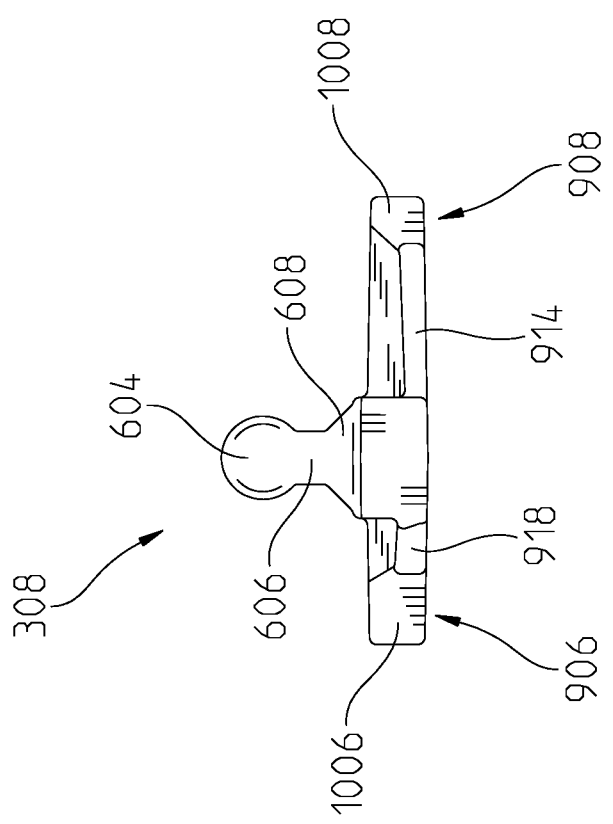
FIG. 15 is a front view of the wing.

In FIG. 12, a bottom surface 1200 of the wing is shown. The bottom surface 1200 can be substantially planar as shown. In other embodiments, one or more ridges may be formed therein to help fracture the soil during penetration.

Figure 6:
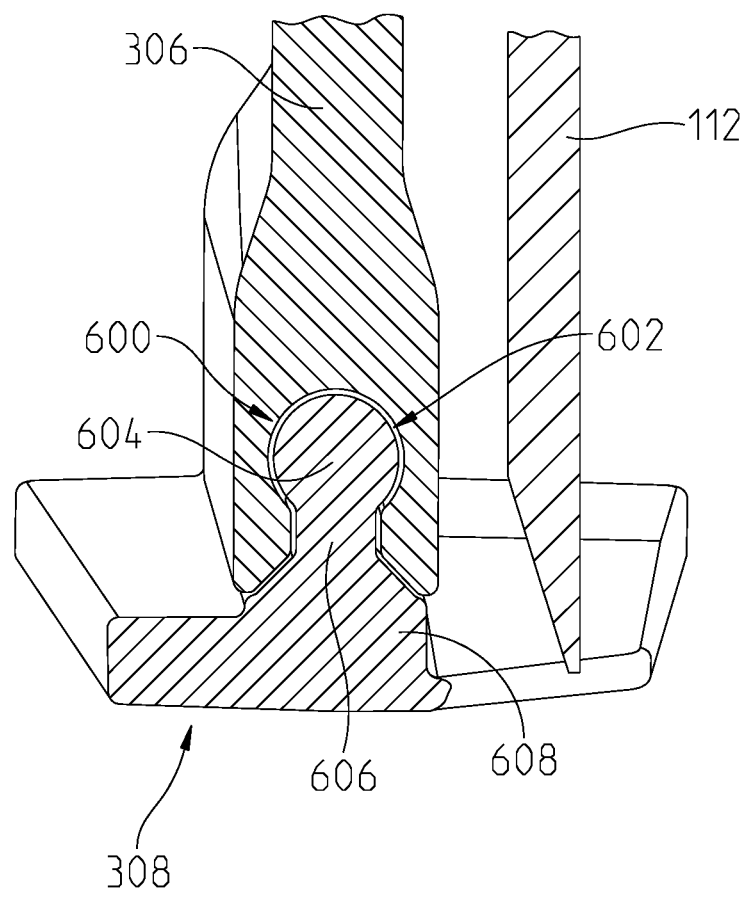
FIG. 6 is a partial cross-sectional view of the single disk fertilizer taken along line 6-6 in FIG. 3.
Figure 10:
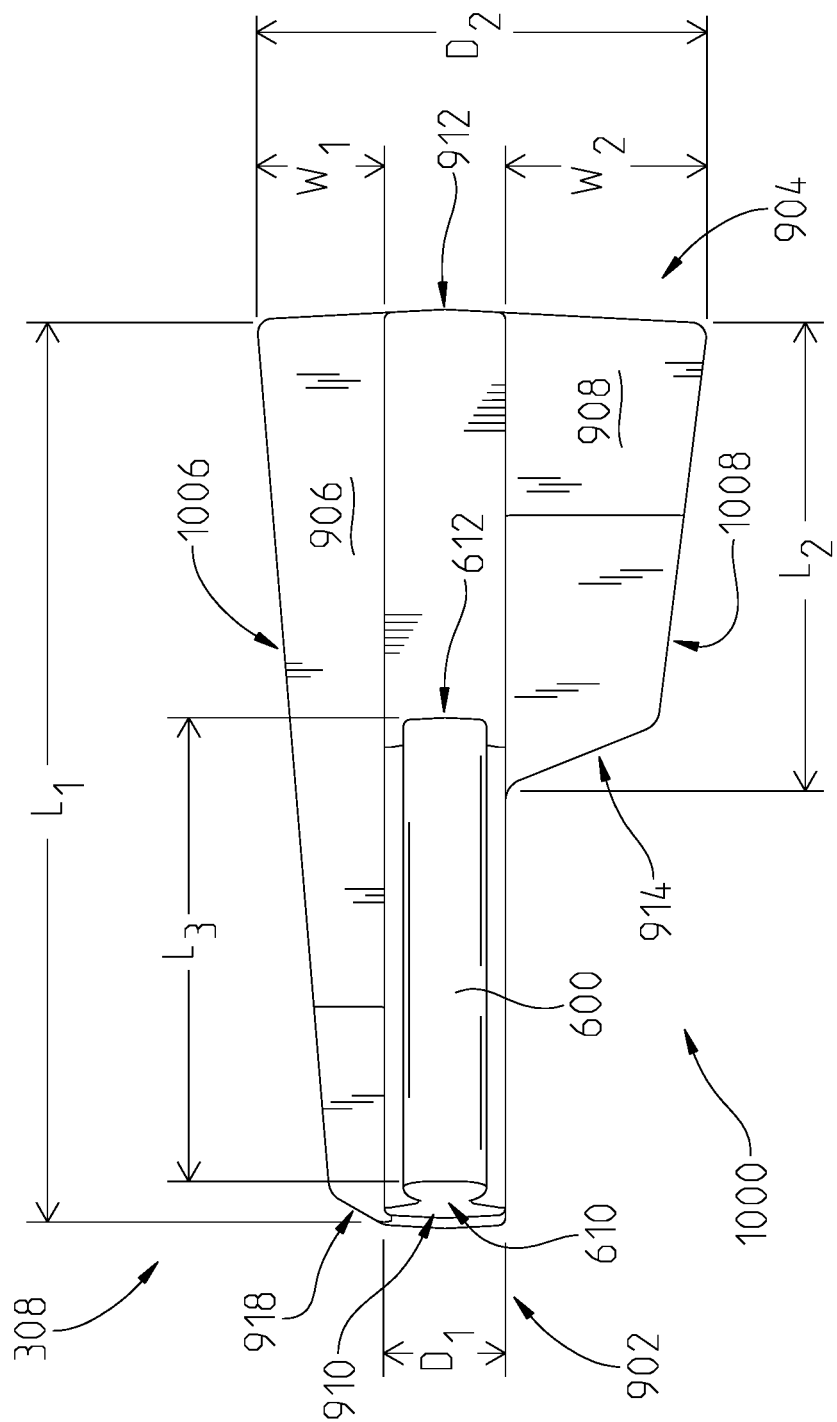
FIG. 10 is a top view of the wing of FIG. 9.
Figure 11:
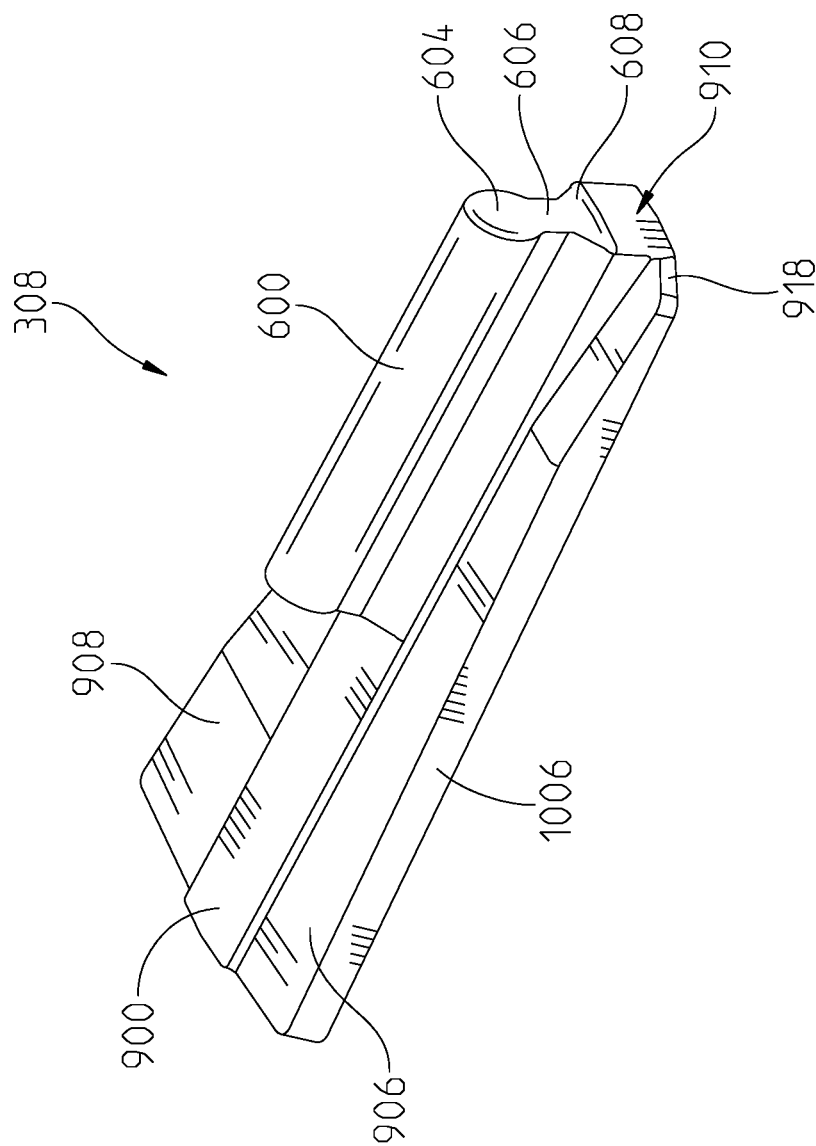
FIG. 11 is a perspective view of a second side of the wing.

Referring to FIGS. 6, 9 and 11, the coupling mechanism 600 of the wing 308 protrudes from an upper portion of the body 900 to form a base portion 608, generally a cylindrical portion 604 and a narrower neck portion 606. The cylindrical portion 604 is located above the narrower neck portion 606 and enables the wing 308 to be removably coupled to the boot 306. For example, as shown in FIGS. 6 and 8, the boot 306 is shown having a key slot 602 defined partially through a bottom portion of the boot 306. The key slot 602 may be shaped to correspond with the cross-sectional shape of the coupling mechanism 600. In particular, as shown in FIG. 10, the coupling mechanism 600 may have a length defined as $L_3$. The key slot 602 may be formed in the boot 306 such that it too has a length approximately the same as $L_3$.

When assembling the wing 308 to the boot 306, the wing 308 may be slidably engaged in the key slot 602 of the boot 306. More specifically, the cylindrical portion 604 of the coupling mechanism 600 may be slidably received in the key slot 602, as shown in FIG. 8. The coupling mechanism 600 may include a front face 610 that is oriented in the working or forward direction, and a rear face 612 that is oriented in the opposite or rearward direction. The rear face 612 of the coupling mechanism 600 is slid into the key slot 602 first. In one embodiment, the coupling mechanism 600 may be slid completely into the key slot 602 until the rear face 612 of the coupling mechanism 600 contacts a wall 804 of the boot 306, as shown in FIG. 8. In another embodiment, the coupling mechanism 600 may be slid into the key slot 602 such that there is a gap or space between the rear face 612 of the coupling mechanism 600 and the wall 804 of the boot.

In a further embodiment, when the coupling mechanism 600 is installed in the key slot 602, the front face 610 of the coupling mechanism 600 may be generally flush with the wall 704 of the boot 306 (see FIG. 7). In another embodiment, the front face 610 may be located internally within the key slot 602 such that it is not generally flush with the wall 704. Alternatively, the coupling mechanism 600 may partially protrude from the key slot 602 such that the front face 610 is externally disposed relative to the key slot 602 and is not flush with the wall 704.

Once the scraper 332 is coupled to the boot 306 as shown in FIG. 7, the position of the scraper 332 relative to the boot 306 is able to maintain the coupling mechanism 600 in the key slot 602 and the wing 308 coupled to the boot 306. As a result, in one embodiment, the dimensions of the cylindrical portion 604 and the narrower neck portion 606 of the coupling mechanism 600 may be smaller than the corresponding key slot 602 to allow for movement between the wing 308 and the boot 306. With a gap or space between the coupling mechanism 600 and the key slot 602, which therefore allows some lateral rocking therebetween, the cylindrical portion 604 may be centered or oriented within the slot 602 as the wing 308 draws through the soil. As it does, the wing 308 may be able to better fracture or break apart the side walls of the trench and allow for better fertilization of the soil as a result.

As shown in FIG. 10, the front end 902 of the wing 308 may be narrower than the rear end 904 thereof. The front end 902 may have a width corresponding to a first distance, $D_1$, and the rear end 904 may have a width corresponding to a second distance, $D_2$. As shown, the second distance, $D_2$, is greater than the first distance, $D_1$, and in some instances at least two or three times greater.

While the front end 902 is narrower than the rear end 904, the first and second lateral wing portions 906, 908 may also be different from one another, as described above with respect to FIGS. 13 and 14. For the sake of this disclosure and the location of each lateral wing portion relative to the cutting disk 112, the first lateral wing portion 906 may be referred to as an external lateral wing portion and the second lateral wing portion 908 may be referred to as an internal lateral wing portion. The internal lateral wing portion may be positioned in closer proximity to the cutting disk 112, whereas the external lateral wing portion is positioned on the opposite side of the wing 308 and further from the cutting disk 112. In the illustrated embodiment of FIG. 10, the first or external lateral wing portion 906 is located on a right side of the wing 308, and the second or internal lateral wing portion 908 is located on a left side of the wing 308. In an alternative embodiment, however, the internal lateral wing portion may be located on a right side of the wing 308, and the external lateral wing portion may be located on a left side of the wing. Thus, the location of the internal and external lateral wing portions relative to the body 900 may be interchangeable, and the illustration of the lateral wing portions in FIGS. 6-15 is only one such embodiment.

In FIG. 10, the first or external lateral wing portion 906 is shown having a first length, $L_1$, and a first width, $W_1$. The second or internal lateral wing portion, 908, has a second length, $L_2$, and a second width, $W_2$. As shown in the embodiment of FIG. 10, the first lateral wing portion 906 is longer than the second lateral wing portion 908, but the first lateral wing portion 906 has a smaller width than the second lateral wing portion 908. The first lateral wing portion 906 may also have a longer length than the length, $L_3$, of the coupling mechanism 600.

The embodiment of FIG. 10, however, is only one such embodiment of the wing 308. In another embodiment, the first lateral wing portion 906 may be shorter than the second lateral wing portion 908. In a further embodiment, the first lateral wing portion 906 and the second lateral wing portion 908 may be approximately the same length. Moreover, the first lateral wing portion 906 may have a larger width than the second lateral wing portion 908. Alternatively, the first lateral wing portion 906 and the second lateral wing portion 908 may have approximately the same width.

As described above and shown specifically in FIG. 10, the second or internal lateral wing portion 908 has a shorter length than the first or external lateral wing portion 906. In FIG. 10, an area 1000 may be defined between the front end 902 of the wing 308, an internal side wall 916 of the body 900, and the second or internal lateral wing portion 908. The area 1000 is left open or unoccupied by the wing 308 in order to accommodate the cutting disk 112. As a result, this area 1000 is partially occupied by the cutting disk 112, which is spaced from the wing 308 to prevent the cutting disk 112 from coming into contact with the wing 308. Thus, the wing 308 may have a longer lateral surface on the external side of the wing 308 opposite of the cutting disk 112, i.e., the first or external lateral wing portion 906 is longer than the second or internal lateral wing portion 908.

From FIG. 10, it is also shown that the lateral edges of the first lateral wing portion 906 and the second lateral wing portion 908 are tapered or angled inwardly towards the front end 902 of the wing 308. For example, the first lateral wing portion 906 may include a first tapered edge 918 and a second tapered edge 1006. The second lateral wing portion 908 may also include a third tapered edge 914 and a fourth tapered edge 1008. Each tapered edge tapers or angles outwardly from a location nearest the front end 902 towards the rear end 904 of the wing 308. As it does, this allows the wing 308 to better penetrate through the soil and break it apart. Moreover, the wing 308 allows the single disk fertilizer opener assembly 110 to cut deeper into the soil and deposit fertilizer at a greater depth in the soil, which may be particularly important when the soil is hard and compact.

In this embodiment, the wing 308 is further designed to break up the sidewalls of the furrow or trench formed by the cutting disk 112 and help seal NH3 gas or other fertilizer in the furrow or trench until the closing system can close it. As shown best in FIG. 4, the wing 308 may be coupled to the boot 306 at an inclining angle such that its leading edge 910 is lower than its trailing edge 912. The wing 308 is thus able to break up the sidewall of the soil formed in the trench and also propel the assembly 110 downwardly into the soil to reach a desired depth. The soil provides a resistance to the assembly 110 thereby pulling the assembly downwardly.

With the lateral compaction of the furrow or trench being fractured or broken apart by the wing 308, the crops and plants are better able to grow as their roots can penetrate through the soil better and take root at a greater depth.

Moreover, the wing 308 helps provide a downward force to the working end of the assembly 110 in order to reduce the amount of downward force required to penetrate the ground or soil 320. The downforce applied to the assembly 110 through the parallel first and second arms 206, 208 and spring 204 comes from the weight of the frame. Thus, any downward force generated by the wing 308 as the wing 308 is drafted through the soil may reduce the downforce needed from the frame meaning that the frame can potentially weigh less or additional weights do not need to be added to the frame.

Another feature of the boot 306 shown and described herein is that its leading edge can be replaceable since it is retained by at least one fastener, e.g., one, two, three, or more fasteners. The wing 308 may also be easily disassembled from the boot 306 and replaceable as it wears. As described above, the wing 308 is retained by a key slot 602 formed in the bottom of the boot 306. The wing 308 may slide in and is maintained within the key slot 602 by the scraper 332. There may be a gap or space between the leading edge 910 of the wing 308 and the scraper 332, but the gap or space is smaller than the overall length, $L_3$, of the coupling mechanism 600. The wing 308 and the scraper 332 can be high wear items, and thus making these parts easily removable and replaceable allows for less expensive repair.

In some embodiments, the single disk fertilizer opener assembly 110 described herein does not include its own closer or closing disks. Instead, the planting unit 118 can follow the assembly 110 and may drop seeds into the furrow or trench formed by the cutting disk 112. In other embodiments, however, it may be possible to incorporate a closer with the assembly 110.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wing removably coupled to a single disk fertilizer opener for breaking apart soil in a trench, comprising:
   a body comprising a front end, a rear end, a first side, and a second side;

a first wing portion integrally formed with the body, the first wing portion extending laterally outward from the first side of the body;

a second wing portion integrally formed with the body, the second wing portion extending laterally outward from the second side of the body; and a coupling mechanism integrally formed with the body, the coupling mechanism configured to be coupled to the opener;

wherein the first wing portion is longer than the second wing portion; and wherein the first wing portion comprises a smaller width than the second wing portion.

2. The wing of claim 1, wherein the coupling mechanism comprises a base portion, a neck portion, and a cylindrical portion, the neck portion having a smaller width than the base portion and the cylindrical portion.

3. The wing of claim 2, wherein the base portion, the neck portion, and the cylindrical portion each comprise approximately the same length.

4. The wing of claim 1, wherein the coupling mechanism comprises a first length and the body comprises a second length, the first length being less than the second length.

5. The wing of claim 1, wherein the coupling mechanism is integrally formed with the body towards the front end thereof.

6. The wing of claim 1, wherein the body comprises a length defined between a leading edge and a trailing edge, the length of the body being greater than the length of at least one of the first wing portion and second wing portion.

7. The wing of claim 1, wherein:
the first wing portion comprises a first tapering edge and a second tapering edge, the first tapering edge forming a front edge of the first wing portion;
the second wing portion comprises a first tapering edge and a second tapering edge, the first tapering edge forming a front edge of the second wing portion; and
the body comprises a length defined between a leading edge and a trailing edge, the front edge of the first wing portion tapering inwardly towards and being integrally coupled with the leading edge of the body.

8. The wing of claim 7, wherein the front edge of the second wing portion is longitudinally spaced apart from not integrally coupled with the leading edge of the body.

9. The wing of claim 7, wherein the second tapering edges of the first and second wing portions are integrally coupled with the trailing edge of the body.

10. The wing of claim 1, wherein the first wing portion comprises a first thickness and the second wing portion comprises a second thickness, wherein the first thickness and the second thickness are approximately the same.

11. The wing of claim 1, wherein the first wing portion comprises a length defined by a first longitudinal section and a second longitudinal section, the first longitudinal section comprising a substantially constant thickness and the second longitudinal section comprising a tapering thickness.

12. The wing of claim 1, wherein the second wing portion comprises a length defined by a first longitudinal section and a second longitudinal section, the first longitudinal section comprising a substantially constant thickness and the second longitudinal section comprising a tapering thickness.

13. The wing of claim 1, wherein the coupling mechanism comprises a front face and a rear face, the front face tapering downwardly to a leading edge of the body.

14. The wing of claim 1, further comprising:
a first width formed by the front end of the body; and
a second width formed by the rear end of the body, a first rear edge of the first wing portion, and a second rear edge of the second wing portion;
wherein the first width is smaller than the second width.

15. A wing removably coupled to a single disk fertilizer opener for breaking apart soil in a trench, comprising:
a body comprising a front end, a rear end, a first side, and a second side;
a first wing portion integrally formed with the body, the first wing portion extending laterally outward from the first side of the body;
a second wing portion integrally formed with the body, the second wing portion extending laterally outward from the second side of the body; and
a coupling mechanism integrally formed with the body, the coupling mechanism configured to be coupled to the opener;
wherein the body comprises a body length defined between a leading edge and a trailing edge, the first wing portion comprises a first length defined by a first longitudinal section integrally formed with the trailing edge and a second longitudinal section integrally formed with the leading edge, and the first longitudinal section comprising a substantially constant thickness and the second longitudinal section comprising a tapering thickness;
wherein the second wing portion comprises a second length defined by a first longitudinal section integrally formed with the trailing edge and a second longitudinal section, the first longitudinal section comprising a substantially constant thickness and the second longitudinal section comprising a tapering thickness; and
wherein the first longitudinal section of the first wing portion is longer than the second length.

16. The wing of claim 15, wherein the body comprises a body height, the first wing portion comprises a first maximum height, and the second wing portion comprises a second maximum height, the body height being greater than the first maximum height and the second maximum height.

17. A wing removably coupled to a single disk fertilizer opener for breaking apart soil in a trench, comprising:
a body comprising a leading edge, a trailing edge, a first side, a second side, and a length defined between the leading edge and the trailing edge;
a first wing portion integrally formed with the body, the first wing portion extending laterally outward from the first side of the body;
a second wing portion integrally formed with the body, the second wing portion extending laterally outward from the second side of the body; and
a coupling mechanism integrally formed with the body, the coupling mechanism configured to be coupled to the opener;
wherein the first wing portion is longer than the second wing portion; and
wherein a front edge of the second wing portion is longitudinally spaced apart from the leading edge of the body.

18. The wing of claim 17, wherein the coupling mechanism comprises a base portion, a neck portion, and a cylindrical portion, the neck portion having a smaller width than the base portion and the cylindrical portion.

19. The wing of claim 18, wherein the coupling mechanism comprises a length, and the length of the coupling mechanism is less than the length of the body.

20. The wing of claim 17, wherein the first wing portion comprises a length defined by a first longitudinal section and a second longitudinal section, the first longitudinal section comprising a substantially constant thickness and the second longitudinal section comprising a tapering thickness.

\* \* \* \* \*